(12) United States Patent
Garrido

(10) Patent No.: US 7,252,278 B2
(45) Date of Patent: Aug. 7, 2007

(54) DRIVE NUT AND SCREW FOR SEAT ADJUSTER

(75) Inventor: Pascal E. Garrido, Kilworthy (CA)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 10/697,539

(22) Filed: Oct. 29, 2003

(65) Prior Publication Data

US 2004/0089784 A1    May 13, 2004

Related U.S. Application Data

(63) Continuation-in-part of application No. 10/015,445, filed on Dec. 8, 2001, now abandoned.

(51) Int. Cl.
*F16M 13/00* (2006.01)
(52) U.S. Cl. .................... 248/424; 248/430; 297/344.1
(58) Field of Classification Search ................ 248/424, 248/430; 297/344.1, 344.15, 344.17; 74/89.15

See application file for complete search history.

(56) References Cited

U.S. PATENT DOCUMENTS

| | | | | |
|---|---|---|---|---|
| 4,693,128 A | * | 9/1987 | Plow | 74/104 |
| 5,172,601 A | * | 12/1992 | Siegrist et al. | 74/89.36 |
| 5,292,164 A | * | 3/1994 | Rees | 296/65.15 |
| 5,445,354 A | * | 8/1995 | Gauger et al. | 248/429 |
| 5,456,439 A | * | 10/1995 | Gauger | 248/429 |
| 5,797,293 A | * | 8/1998 | Chaban | 74/89.36 |
| 6,105,920 A | * | 8/2000 | Gauger | 248/429 |
| 6,290,199 B1 | * | 9/2001 | Garrido et al. | 248/424 |
| 6,502,798 B1 | * | 1/2003 | Frohnhaus et al. | 248/422 |

* cited by examiner

*Primary Examiner*—Anita King
*Assistant Examiner*—Steven M. Marsh
(74) *Attorney, Agent, or Firm*—Dean B. Watson

(57) ABSTRACT

A vehicle seat linkage assembly includes a rod. The linkage has a first link with an aperture and a second link adjacent but spaced from the first link and having a slot. Additionally, a drive nut is adjacent the rod. The drive nut has a body portion, one end, another end and an aperture engaging the rod. The one end is inserted into the slot and the another end is inserted into the aperture. When the nut is disposed into the slot and aperture, the nut is rotated to engage the slot and the aperture so that the nut cannot be disengaged from the first link and the second link.

12 Claims, 8 Drawing Sheets

DRIVE NUT AND SCREW FOR SEAT ADJUSTER

CROSS-REFERENCE TO RELATED APPLICATIONS

This application is a continuation in part of U.S. patent application Ser. No. 10/015,445, filed on Dec. 8, 2001 now abandoned.

STATEMENT REGARDING FEDERALLY SPONSORED RESEARCH

Not Applicable.

REFERENCE TO MICROFICHE APPENDIX

Not Applicable.

BACKGROUND AND SUMMARY OF THE INVENTION

The present invention relates to a drive nut a drive screw for a seat adjuster and in particular to a nut and screw of a vehicle seat assembly that provides ease of assembly and low noise during operation.

Power seat adjuster are a popular option on many automotive vehicles and are frequently offered as standard equipment on higher priced vehicles. Such power seat adjusters are primarily used on the driver's seat and sometimes, on the front passenger seat of the vehicle to provide selective horizontal fore and aft and vertical movement of the seat as well to provide a comfortable seating position to suit each occupant's preference.

Such power seat adjusters typically carry a support frame, which supports the seat bottom and in some applications the seat back of the vehicle seat. The seat support frame is mounted on first and second, spaced track assemblies, each formed of an upper track, which is connected to the seat support frame and is slidably mounted on a lower track anchored to the vehicle floor. A drive mechanism typically includes a bi-directional electric motor, which rotates a pair of drive shafts extending outward from the motor to a gear assembly or box mounted on each upper track. In one arrangement, each gearbox rotates a lead screw extending longitudinally below each upper track. A drive block is fixedly mounted to each lower track and threadingly receives the lead screw to cause reciprocal, horizontal movement of the upper track and the attached seat support frame upon selective energization of the drive motor and the drive shafts.

Similar drive mechanisms are provided for vertical (up and down) adjustment of the seat support frame and, in a seat adjuster having a seat recliner adjustment mechanism, for angularly adjusting the position of the seat back with respect to the seat bottom. The vertical drive mechanism may also include separate front and rear edge seat adjustment drive mechanisms for selectively tilting the front rear edges of the seat bottom independent of each other as well as simultaneously to raise and lower the entire vehicle seat or, in some applications, only the seat bottom or cushion.

Each vertical and recliner drive mechanism also includes a drive motor having a rotatable output shaft connected to a gear assembly either directly in the case of the front and rear vertical drive mechanisms or by means of two shafts extending a from single motor to separate gear assemblies mounted on each upper track or on the seat support frame in the case of a seat recliner drive mechanism.

As the various drive motors are mounted between the track assemblies, the drive motor output shafts and drive shafts connected thereto are typically oriented perpendicular to the axis of the associated lead screw. In order to transmit rotation and drive force between the output shaft of the drive motor and the drive shaft connected thereto to the 90 degree offset lead screw, each gear assembly box typically includes a worm gear, which is insert molded on one end of the associated lead screw. A worm is rotatably mounted in the gear box housing in meshing engagement with the worm gear and is connected to either one of the drive motor output shafts or to one of the drive shafts so as to rotate the worm gear and thereby the lead screw upon bi-directional energization of the selective drive motor. Thus, each drive motor requires a separate gear assembly for each lead assembly for each lead screw driven by the drive motor.

The rigid connection between the gears in the gear assembly, the drive shaft motor output shaft, the drive shaft, the lead screw and drive block also leads to additional problems during assembly and operation of a power seat adjuster. It is inevitable in the manufacture assembly of a mechanical mechanism, such as power seat adjuster, that dimensional conditions, such as concentricity, TIR, and linear discrepancies from nominal design dimensions, can and typically do occur. These dimensional conditions, without correction, can cause various problems in the operation of the power seat adjuster, such as poor breakaway from a stop position, slow operation of the power seat adjuster in extreme temperatures, excessive wear of the components of the power seat adjuster, uneven operation of the power seat adjuster.

Another aspect of a power seat adjuster, which is critical in the use of a power seat adjuster, particularly during excessive forces generated during a vehicle collision, is the requirement for seat integrity. As the occupant's seat belt is frequently attached by a seat belt buckle mounting bracket directly to one of the upper tracks of a power seat adjuster to enable the seat belt to move fore and aft with the upper track, any forces exerted on the occupant during a vehicle collision are transmitted directly though the seat belt buckle mounting bracket to the upper track. These forces cause the upper track to move upward with respect to the lower track and, in the event of excessive force, could lead to a complete pullout or separation of the upper track and the attached seat from the lower track. In order to prevent track separation, seat integrity requirements have necessitated the design of the components of a power seat adjuster to resist track separation.

Several attempts have been made to provide adapters that meet the above requirements. For example, in U.S. Pat. Nos. 5,172,601, 5,467,957, and 5,575,531, a drive nut with a pair of opposing flat sided legs with rounded edges that engages a bracket having wings with a pair of opposing open ended keyhole slots is disclosed. The slots have an arcuate portion in communication with a pair of opposing flat sides. The legs are inserted into slots and then rotated so that the rounded edges of the legs engage the arcuate portion of the slots. However, the load carrying capability of the wings is reduced because of the size of the opening in the slots required to insert the legs. As a result, these designs are not always able to resist separation forces on the seat and are prone to structural failure by allowing the slots to bend and the legs to separate from the slots causing separation of the seat.

Another attempt to solve the above problem is shown in U.S. Pat. No. 5,860,319. This design uses a round block drive device to fit into a housing. A resilient member is used to cushion or isolate the drive block from the housing. The resilient member co-acts with holes formed in the side walls of the housing to permit relative motion of the threaded interconnected lead screw and drive block with the housing. This design is expensive and difficult to assembly and has not been widely used in vehicle seat applications.

Thus, the vehicle seat assemblies and, in particular seat assemblies having power adjustment capability, it is desirable to provide an adjuster, which produces low noise, emissions during operation prevents seat separation and is simple and inexpensive to make. Furthermore, it is desirable to provide an adjuster that can be easily assembled to reduce assembly time and errors.

The present invention seeks to solve most of the above problems with a simple, quiet, easy to assemble drive nut that is structurally superior to known present designs.

A vehicle seat linkage assembly including a threaded rod defining a longitudinal axis. The linkage includes a first link having a portion forming an enclosed aperture. A second link is adjacent but spaced away from the first link. The second link having a portion forming a slot. The slot has a circular portion. The circular portion and the enclosed aperture define a lateral axis extending between the first link and the second link. Additionally, a drive nut threadably engages the rod. The drive nut has one lateral projection, another lateral projection opposite the one projection and a portion engaging the rod. The drive nut and rod are moveable so that the longitudinal axis is positioned relative to the lateral axis to insert the one projection into the slot and to position the another projection adjacent but spaced away from the aperture while the one lateral projection remains in the slot. The another projection has a width substantially the same as the base of the aperture. Thereafter moving the another projection relative to insert the another projection into the aperture while the one lateral projection remains in the slot.

The present invention is advantageous in that the drive nut engages a slot on one side and an aperture on the other side so that the drive nut is prevented from being withdrawn from the slot and the aperture. Furthermore, the drive nut is easy to assemble, inexpensive to make and produces law noise.

From the foregoing disclosure and the following more detailed description of the various preferred embodiments, it will be apparent to those skilled in the art that the present invention provides a significant advance in the technology and art of vehicle seat linkage assemblies. Additional features and advantages of various preferred embodiments will be better understood in view of the detailed description provided below.

Figure 1:
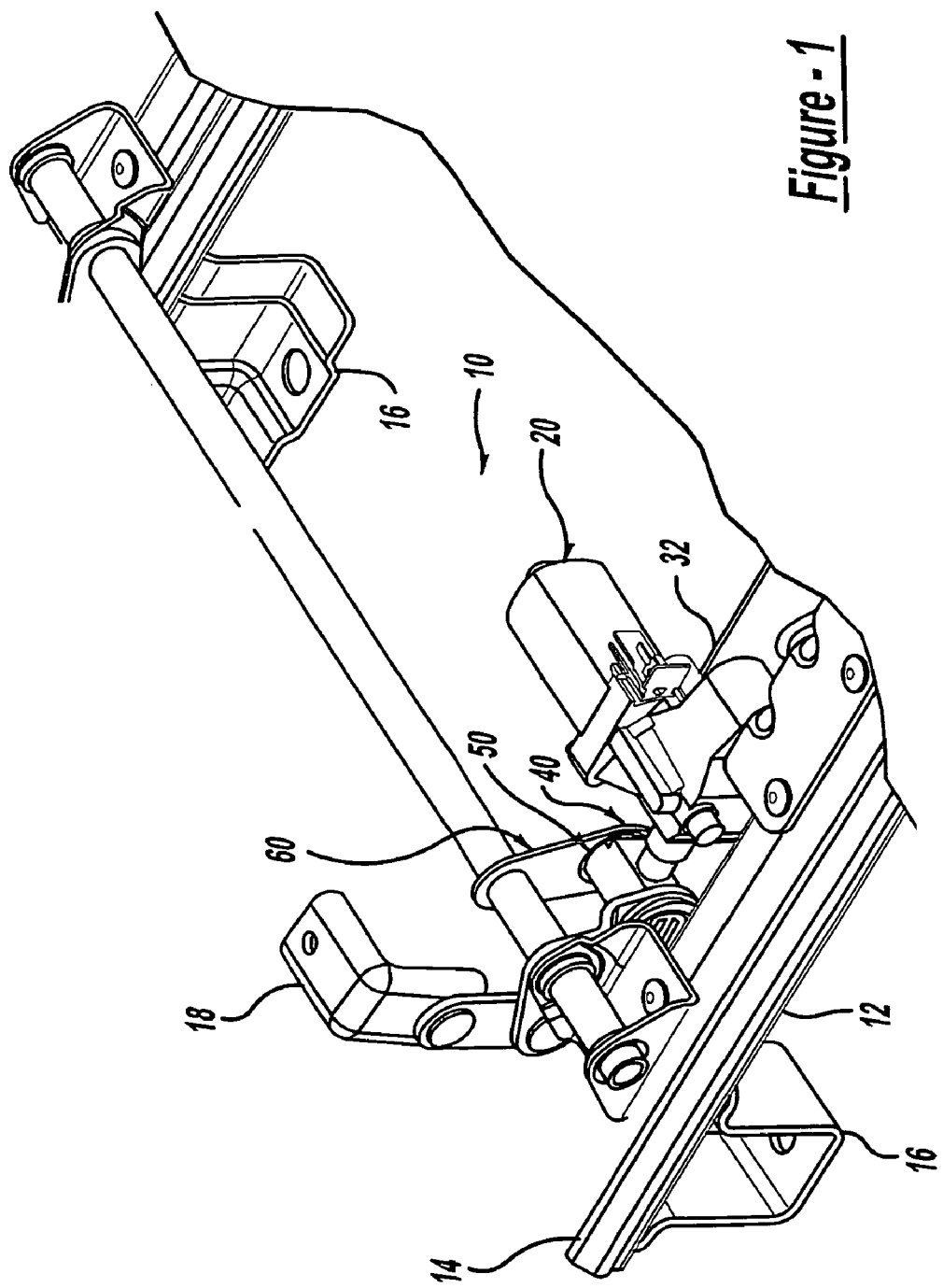
FIG. 1 is a side partial sectional view of a seat adjuster according to the present invention.
Figure 2:
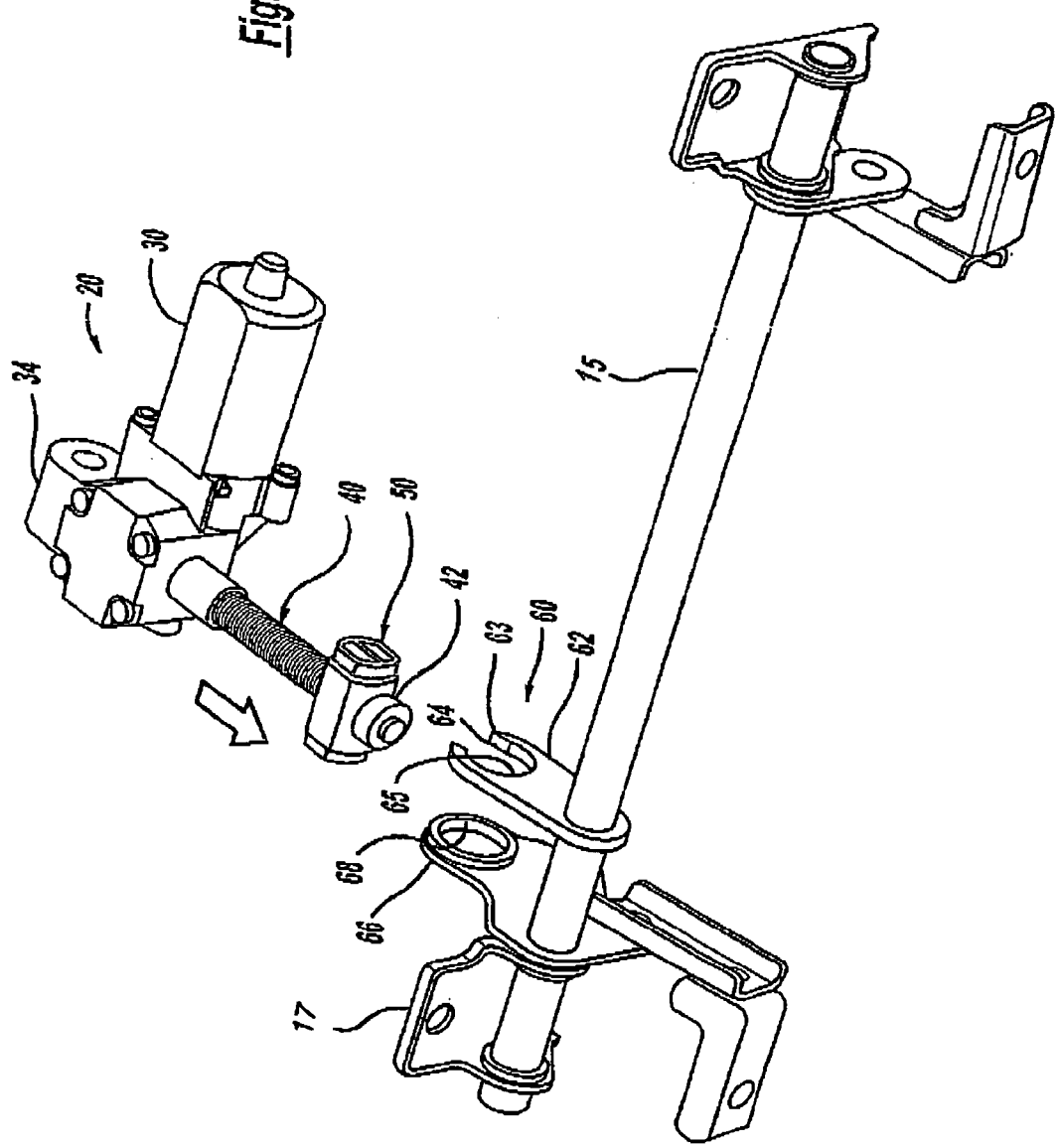
FIG. 2 is an exploded perspective view of the drive member.

It should be understood that the appended drawings are not necessarily to scale, presenting a somewhat simplified representation of various preferred features illustrative of the basic principles of the invention. The specific design features of the seat adjuster assembly as disclosed here, including, for example, specific dimensions of the drive nut and its associated bracket, will be determined in part by the particular intended application and use environment. Certain feature of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the drive member in the seat structure illustrated in the drawings.

DETAILED DESCRIPTION OF THE INVENTION

The seat structure 10 shown in FIG. 1 includes a seat adjuster with the drive nut and screw of the present invention in the seat adjuster. Seat structure 10 includes a lower rail or frame member 12 and an upper rail of frame member 14 that is slidably carried by the lower rail 12 to move the seat fore and aft relative to a motor vehicle in which the seat is mounted. Lower rail 12 includes a pair of support legs 16 that are adapted to mount seat structure 10 to a motor vehicle floor pan. A seat riser 18 is fastened to the upper rail. The seat cushion and seat back are mounted to the seat riser, which is moved by drive member 20.

Referring to FIGS. 2-6 drive member 20 includes electric drive motor 30 for drive rod spindle 40 and drive nut 50 in bracket 60. Motor 30 is mounted to seat riser 18 by bracket 32. Motor 30 is connected to transmission assembly 34 by a conventional fastening means. Optionally, a flexible cable is used to connect the motor 30 to transmission assembly 34. Transmission assembly 34 includes a worm (not shown) that engages with the and drives a worm gear (not shown). The worm gear is molded onto and integral with the drive rod 40 that is preferably threaded.

As will be described in greater detail below, the drive rod 40 is engaged for relative movement with a drive nut 50. Drive nut 50 is, in turn, mounted to bracket 60 that is fixed to the lower frame member, by conventional fastening means including welding. Rotation of the drive rod while drive nut 50 is held against rotation by bracket 60 produces an axial travel of drive nut 50 relative to the drive rod 40. Drive rod 40 is coupled to the upper frame member 14 through the transmission assembly 34 and bracket 32 while drive nut 50 is carried by lower frame member 12. Rotation of drive rod 40 thus results in movement of upper frame rail 14 relative to lower frame member 12. This moves the seat assembly relative to the vehicle.

Drive nut 50 and bracket 60 contain specific features that result in improved ease of assembly of the seat adjuster, improved structural integrity of the joint and low noise.

Drive nut 50 has a main body with longitudinal axis 51. Main body 52 has through passage 52 that is preferably a threaded aperture. Alternatively, passage 52 may be of any suitable configuration that is consistent with the teaching of the invention. A pair of ends 54 extend axially along longitudinal axis 51 from main body 52 in opposite directions. The bottom portion of main body 52 and the entire cross section of each of the ends 54 have a cross section 55 that is preferably circular. Alternatively, cross section 55 may be any shape consistent with the teachings of the invention. Main body 52 and each end 54 has two opposite sides 56 that are preferably flattened over its entire axial length. Alternatively, sides 56 may be partially arcuate. Preferably, drive nut 50 is made of vibration isolating material such as nylon. Alternatively, drive nut 50 can be made of any other suitable thermoplastic or thermostat plastic.

Bracket 60 is formed in a shape of a pair of transversely spaced apart legs 62, 66 respectively fixed to the lower frame member by conventional fastening means including fasteners and welding. Bracket 60 has first leg 62 and second leg 66, which is adjacent but spaced away at a first width 61 from first leg 62. Bracket 60 is mounted to a tubular member 15 that is rotatably mounted to frame rail 14 by a U-shaped member 17. Optionally, leg 62 is connected to leg 66 by means of a bridge to form a U-shaped member, which positioned adjacent to frame member 12 and fastened conventionally thereto. Seat riser 18 is connected to bracket 60. Leg 62 has a slot 63 at its free end. Slot 63 has a pair of opposing flattened sides to form guide portion 64 that extends from its free end to interior arcuate portion 65. Preferably, slot 63 resembles a keyhole shape. Alternatively, slot 63 may take any form consistent with the teachings of the invention. The shape of interior arcuate portion 65 is preferably a diameter that is larger than the width of guide portion 64. Alternatively, the arcuate portion 65 is at least 85% of the inner surface of the aperture or further alternately the arcuate portion 65 is at least 90% of the interior surface. Second leg 66 has an aperture 68 near its free end. Guide portion 64 is preferably has opposing flattened surfaces but alternatively may be opposing slightly arcuate shapes or any other opposing shapes that permit drive nut 50 to pass through slot 63. The interior arcuate portion 65 defines a plane with a first axis of rotation. Aperture 68 has a second axis of rotation formed on a plane. A transverse axis 69 extends from the first axis of rotation to the second axis of rotation.

Figure 3:
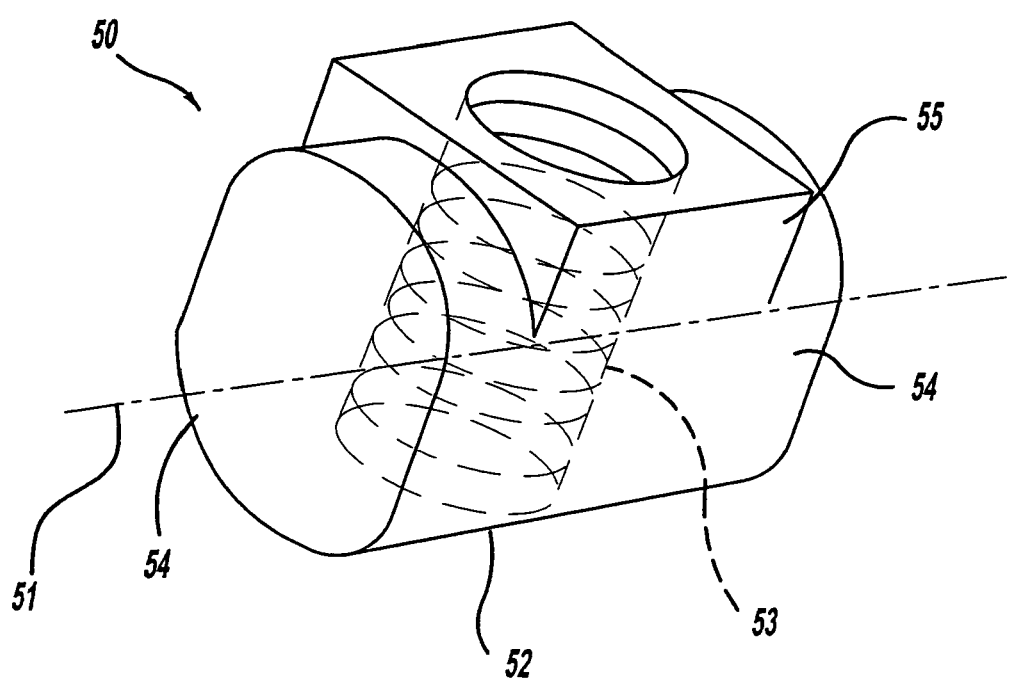
FIG. 3 is a perspective view of the drive nut.
Figure 3A:
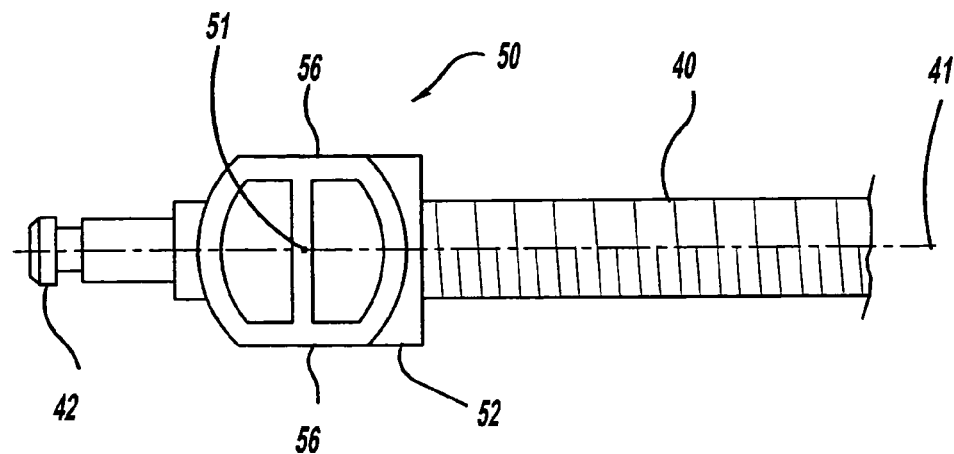
FIG. 3a is a side view of the drive nut.
Figure 3B:
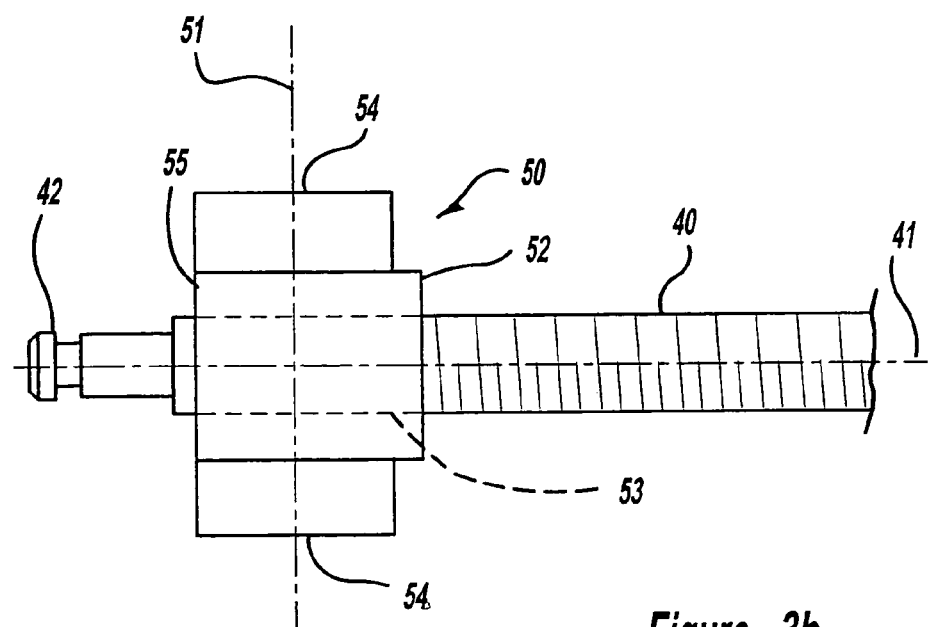
FIG. 3b is a top view of the drive nut.
Figure 4:
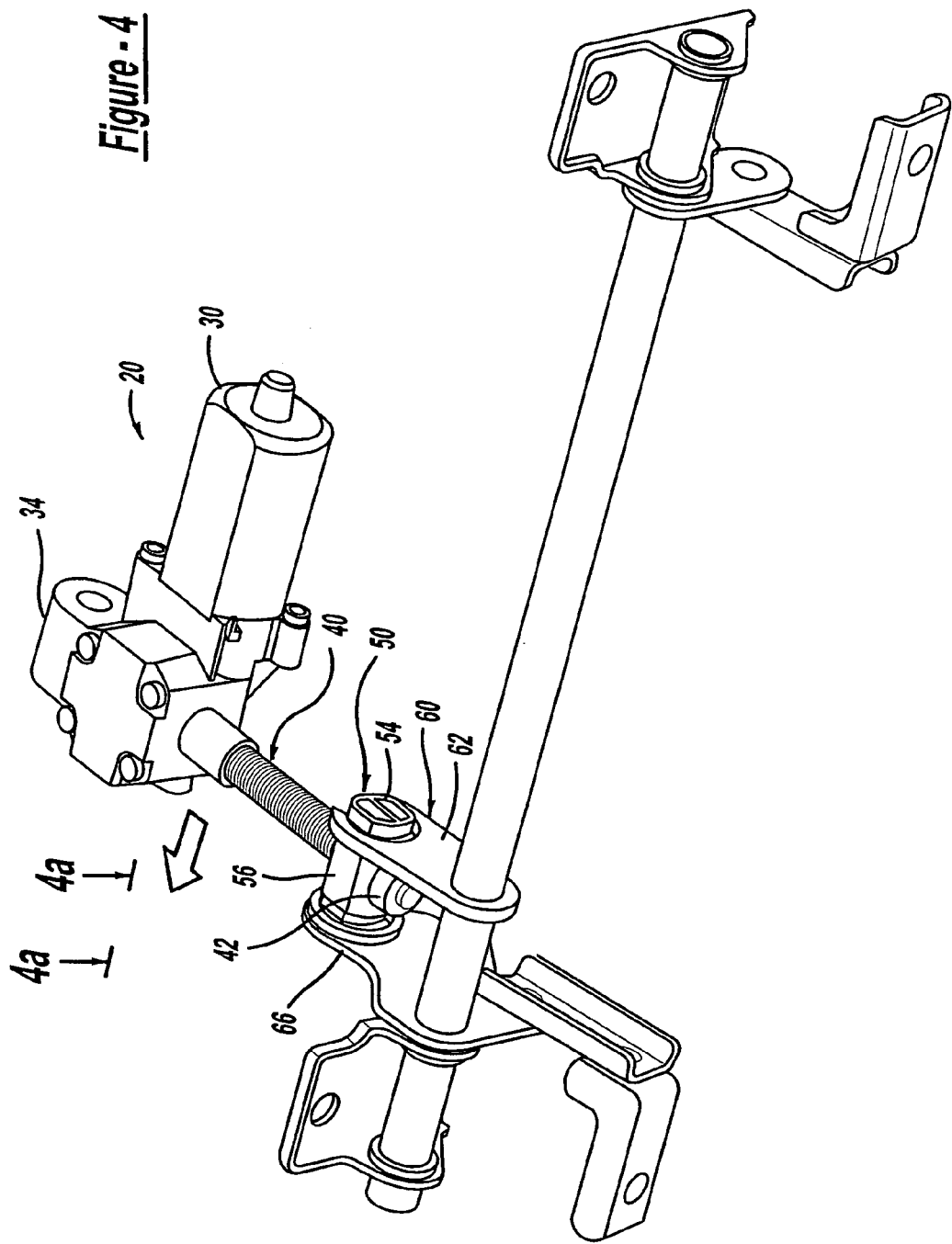
FIG. 4 is a perspective view similar to FIG. 2, showing the drive nut inserted into the slot in one support prior to insertion into the aperture in the other support.
Figure 4A:
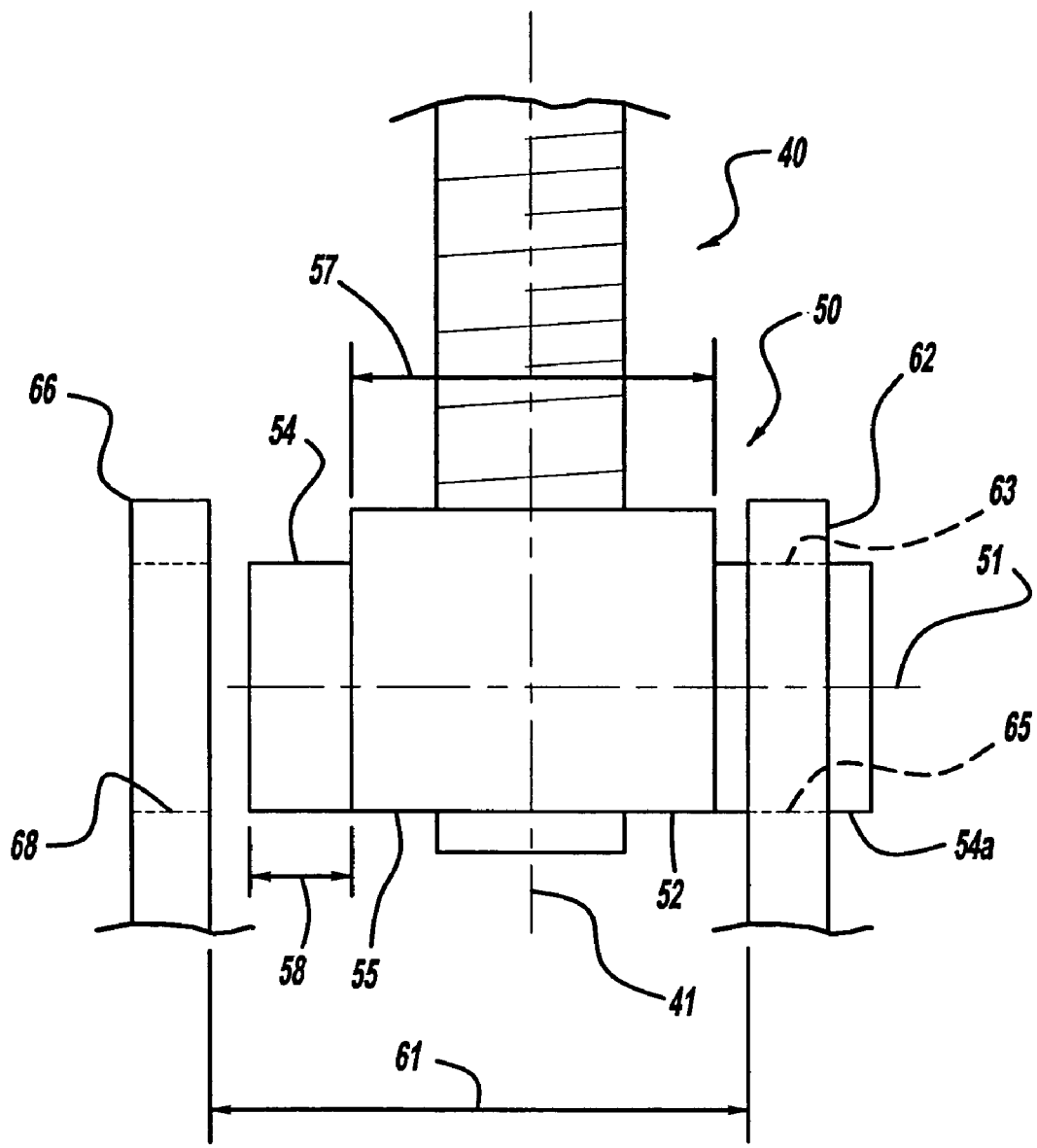
FIG. 4a is a top view along 4a-4a in FIG. 4.
Figure 5:
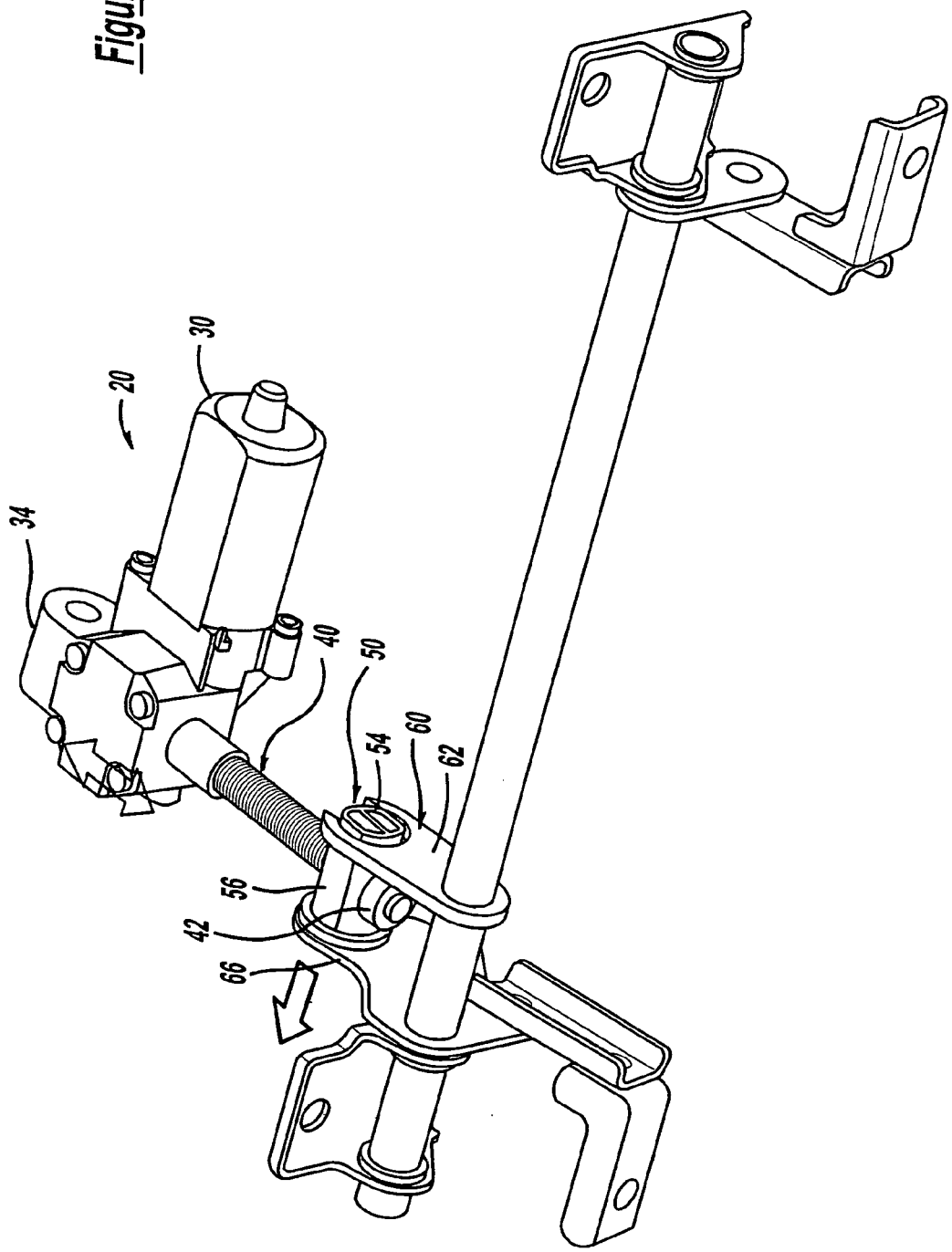
FIG. 5 is a perspective view similar to FIG. 4 in, which the drive nut is inserted into the slot in one support and the aperture in the other support.
Figure 6:
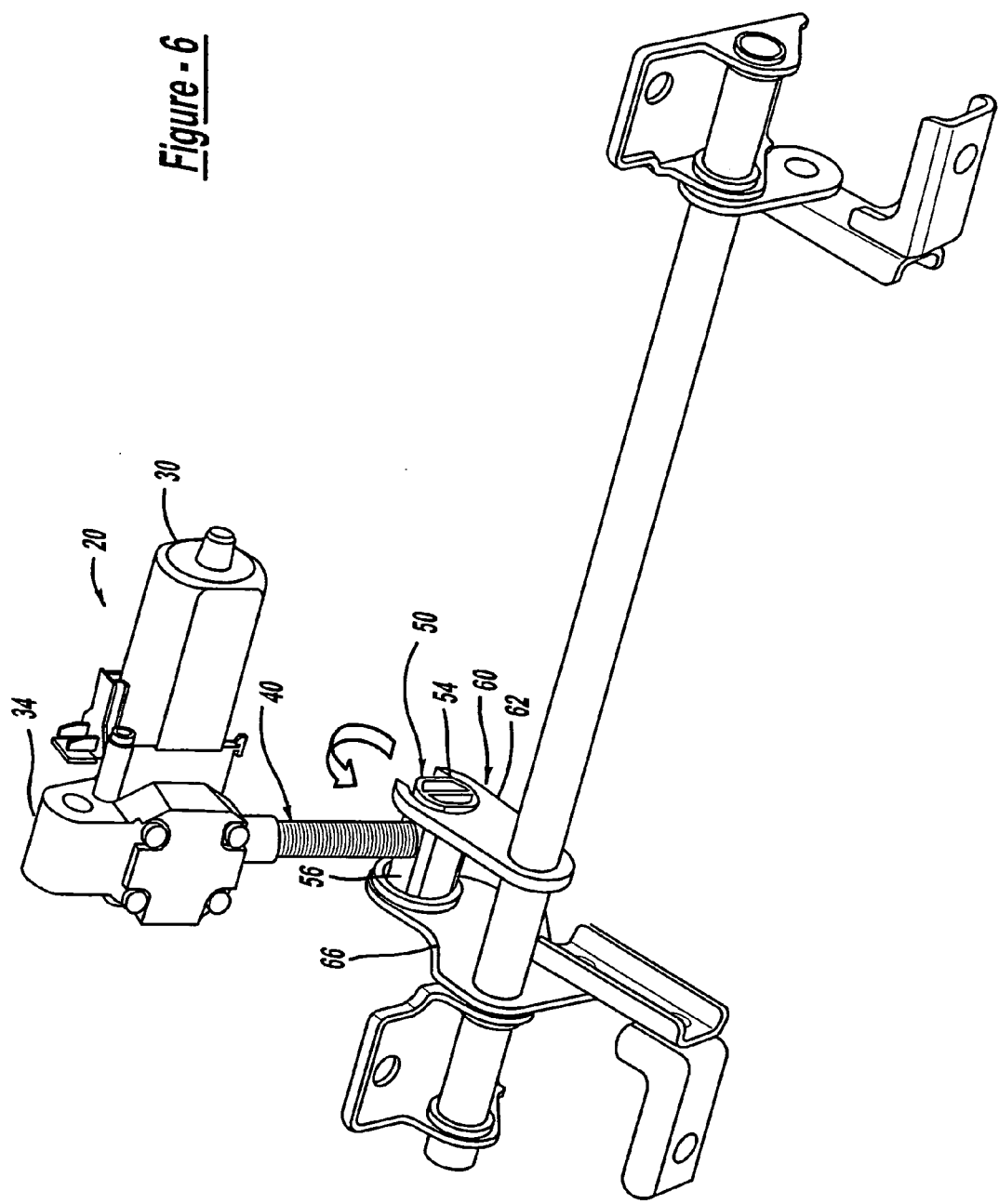
FIG. 6 is a perspective view similar to FIG. 5 in, which the drive nut has been rotated to engage both supports in a fully assembled position.

As shown in FIGS. 3, 3a, 3b, and FIGS. 4 and 4a, cross section 55 of drive nut 50 has a shape that is complimentary with key slot 63 and aperture 68. The largest width of main body 52 as measured between opposing sides 56, as shown in FIG. 3a, is sized to permit main body 52 and another of the ends 54a to pass through opposing sides of guide portion 64 of slot 63. One of the ends 54 is sized to fit into aperture 68. The main body of the drive nut 50 has a longitudinal axis 51 that defines a second width 57. One of the ends 54 extends from the main body 52 of the drive nut 50 along the longitudinal axis 51 and has a third width 58 that extends from the junction at the periphery of the main body to the tip of one of the ends 54 that fits into aperture 68. The second width 57 and the third width 58, when combined, are less than the first width 61 as shown in FIG. 4a When the another end 54a extending from drive nut 50 is inserted into slot 63 and the another end 54a is disposed in arcuate portion 65 of leg 62, main body 52 is translated on the transverse axis 69 until one of the ends 54 is disposed in aperture 68 of leg 66 and the another of the ends 54a remains disposed in arcuate portion 65 of leg 62 as shown in progression from FIG. 4 to FIG. 5. One of the ends 54 has a shoulder portion that is larger in width than the width of the aperture to limit axial movement toward slot 63. After another of the ends 54a is disposed in arcuate portion 65 and the one of the ends 54 is disposed in aperture 68, drive nut 50 is rotated 90 degrees as shown in the progression from FIG. 5 to FIG. 6. When drive nut 50 is rotated, about its longitudinal axis 51 so that circular portion of one end 54 remains disposed in aperture 68 of leg 66 and the other circular portion of another end 54a is disposed in the arcuate portion 65 of leg 62, to prevent disengagement of lock drive nut 50 out of bracket 60. Furthermore, the aperture 68 on leg 66 captures the one end 54 and restricts the movement of the another end 54a out of slot 63.

With structure of bracket 60, that is with slot 63 extending inwardly from the free end of first leg 62, and aperture 68 in alignment with arcuate portion 65, drive nut 50 is assembled with bracket 60 after drive rod 40 has been engaged with drive nut 50. The open ends of bracket 60 avoid any obstacle to drive rod 40 during assembly after drive nut 50 has been mounted to bracket 60, drive rod 50 is further rotated to a position in, which end 42 of drive rod 40 extends beyond drive nut 50. In this position, removal of drive nut 50 is prevented.

In operation, drive nut 50 is moved by motor, 30 which operates to angularly move bracket 60 from one position to another but not to permit disengagement from bracket 60 while functioning as a fore and aft seat adjuster. Thus, the present invention provides a simple easy to assemble and quiet linkage assembly for vehicle seats. While the drive nut screw and bracket of the present invention have been shown in the context of a fore and aft seat adjuster, it is to be understood that these components can be sued in other adjuster mechanisms including a vertical seat adjuster, recliner, etc, where a screw, nut and bracket are used employing the teachings of the invention.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention in various embodiments and with various modifications as are suited to the particular use contemplated. All such modifications and variations are within the scope of the invention as determined by the appended claims when interpreted in accordance with breath to, which they fairly, legally, and equitably entitled.

The invention claimed is:

1. A vehicle seat linkage assembly including a threaded rod defining a longitudinal axis, the linkage assembly comprising, in combination:
   a first link having a portion forming an enclosed aperture;
   a second link adjacent but spaced away from the first link, the second link having a portion forming a slot, the slot having a circular portion, the circular portion and the enclosed aperture defining a lateral axis extending between the first link and the second link; and
   a drive nut threadably engaging the rod, the drive nut having a body portion and a pair of projections with each projection extending oppositely from the body portion, the drive nut and rod being movable to insert one of the pair of projections into the slot and to position the end of the another projection adjacent but spaced away from the aperture and with a portion of one of the pair of projections disposed in the slot, the another of the pair of projections is moved laterally relative to the slot to insert the another of the pair of projections into the aperture and lock the drive nut in the first link.

2. A linkage assembly as claimed in claim 1 wherein the slot and the aperture are in alignment with one another.

3. A linkage assembly as claimed in claim 1 wherein the slot having a portion forming an arcuate portion and guide portion in communication with the arcuate portion.

4. A linkage assembly as claimed in claim 1 wherein the rust link and second link are spaced apart by a rust width, the body portion having a second width, the another of the pair of projections extending from the body portion a third width, the second width and the third width being less then the first width.

5. A linkage assembly as claimed in claim 1 wherein the slot further has a pair of opposing straight sided portions in communication with the circular portion, the circular portion forming a first axis of rotation and the aperture forming a second axis of rotation that defines the lateral axis between the first link and the second link.

6. A linkage assembly as claimed in claim 1 wherein the longitudinal axis and lateral axis are substantially normal to each other when the one of the pair of projections is inserted into the slot.

7. A linkage assembly as claimed in claim 1 wherein the another of the pair of projections has a shoulder portion adjacent a circular portion, the circular portion being sized to fit into the aperture, the shoulder portion is adjacent the aperture in the second link when the another of the pair of projections is inserted into the second link.

8. A linkage assembly as claimed in claim 1 wherein the drive nut has an internal threaded portion, the rod having an external threaded portion.

9. A linkage assembly as claimed in claim 1 wherein the enclosed aperture has an inner arcuate portion forming at least 85% of the inner surface of the aperture.

10. A linkage assembly as claimed in claim 1 wherein the enclosed aperture has an inner arcuate portion forming at least 90% of the inner surface of the aperture.

11. A seat adjuster having first and second frame members adapted to move relative to one another to adjust the position of the first frame member relative to the second frame member, the adjuster comprising, in combination:

a first link attached to the frame, the first link having portions forming an aperture;

a second link attached to the first frame in spaced apart relationship to the first link, the second link having a portion forming a slot, the first link and the second link are in alignment with each other and defining an alignment axis and a laterally extending axis that is normal to the alignment axis, the laterally extending axis is between the first link and the second link, the first link and the second link are spaced apart by the first width;

a drive nut adjacent the second link, the drive nut having one end, another end and a portion extending between the one end and the another end, the portion defining a longitudinal axis, the portion of the drive nut having a second width, the drive nut further having a pair of projections with each projection extending oppositely from the portion, one of the pair of projections extends laterally from the portion by a third width, the second width of the drive nut and the third width of one of the pair of projections is less than the first width, the longitudinal axis of the drive nut is positioned offset relative to the laterally extending axis to move one of the pair of projections into the slot and along the laterally extending axis to dispose the other of the pair of projections into the aperture in the first link while the one of the pair of projections is disposed in the slot, so that after the drive nut is disposed in both the slot and the aperture, the nut is rotated to prevent the one end of the drive nut from disengaging the slot.

12. The seat adjuster as claimed in claim 11 wherein the slot has a portion forming a circular portion and a pair of opposing straight sided portions in communication with the circular portion, the circular portion and the enclosed aperture form a transverse axis that is substantially normal to the alignment axis.

* * * * *